(12) United States Patent
Tseng (10) Patent No.: US 9,871,907 B2
(45) Date of Patent: Jan. 16, 2018

(54) AVATAR-BASED COMMUNICATIONS LAUNCHING SYSTEM

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 721 days.

(21) Appl. No.: 12/917,747

(22) Filed: Nov. 2, 2010

(65) Prior Publication Data

US 2012/0110473 A1    May 3, 2012

(51) Int. Cl.
  *G06F 3/048* (2013.01)
  *H04M 1/725* (2006.01)
  *G06Q 50/00* (2012.01)

(52) U.S. Cl.
  CPC ........ *H04M 1/72544* (2013.01); *G06Q 50/01* (2013.01); *H04M 1/72569* (2013.01)

(58) Field of Classification Search
  None
  See application file for complete search history.

(56) References Cited

U.S. PATENT DOCUMENTS

| | | | | |
|---|---|---|---|---|
| 7,571,249 B2* | 8/2009 | Wu | | 709/238 |
| 7,599,362 B2* | 10/2009 | Sandell et al. | | 370/389 |
| 2002/0174199 A1* | 11/2002 | Horvitz | | 709/220 |
| 2002/0186257 A1* | 12/2002 | Cadiz et al. | | 345/838 |
| 2005/0018820 A1* | 1/2005 | Chaddha et al. | | 379/88.13 |
| 2006/0025164 A1* | 2/2006 | Wang et al. | | 455/466 |
| 2008/0123587 A1* | 5/2008 | Xu | | 370/329 |
| 2008/0222295 A1* | 9/2008 | Robinson et al. | | 709/227 |
| 2010/0241634 A1* | 9/2010 | Madhok | | 707/748 |

* cited by examiner

*Primary Examiner* — William Trapanese
(74) *Attorney, Agent, or Firm* — Baker Botts L.L.P.

(57) ABSTRACT

In one embodiment, a social networking system automatically establish a connection to a target user by selecting an avatar representing the target user, and establishing a connection by a communication channel based on current context and one or more rules configured by the target user.

20 Claims, 7 Drawing Sheets

AVATAR-BASED COMMUNICATIONS LAUNCHING SYSTEM

TECHNICAL FIELD

The present disclosure relates generally to networking systems that facilitate communications connections to a target user and, more particularly, to a system that automatically establishes a connection to a target user by selecting an avatar representing the target user.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. For example, a user of a social networking website can access an address book stored in the social networking website, look up a contact in the address book and connect with the contact through email.

An avatar is a representation of a user in a computer user interface. Avatars may be graphical representations of the user or a player character controlled by a user in the context of a communications application, a game or any other application. Avatars may be two-dimensional or three-dimensional graphical representations. Avatars are typically customizable to allow a user to create an avatar that suits the desires or personality of a given user.

SUMMARY

Particular embodiments relate to a communications or networking system that automatically establishes a connection to a target user in response to a user selecting an avatar representing the target user, and establishing a connection by a communication channel based on current context and one or more rules configured by the target user. These and other features, aspects, and advantages of the disclosure are described in more detail below in the detailed description and in conjunction with the following figures.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention.

Additionally, social networking system may provide various communication channels for users to interact with each other. Thus, users of a social networking system may interact with each other by sending and receiving content items of various types of media through the communication channels. In particular embodiments, communication channels may include, but are not limited to, email, instant messaging (IM), text, voice or video chat, and wall posts. A user of the social networking system may also interact through various communication channels outside the social networking system with another person (a user or non-user of the social networking system). Examples of those communication channels are phone call though public switched telephone network (PSTN) or the Internet (e.g., VOIP or voice over internet protocol), text, voice or video chat, SMS (short message service) text messaging, instant messaging, and email. To keep track of communication channel information, a user of the social networking system may keep one or more address books. An address book may contain one or more contacts (e.g., a person or a business identify) and for each contact, communication channel information for the contact (e.g., a phone number, a user ID for an IM service, an email address, a user ID for a social networking system, home address, etc.). A user of the social networking system may keep the one or more address books inside or outside the social networking system. For example, the social networking system may maintain an address book for a user, and the user can access the address book though the social networking system's web site, or through a client application hosted by a client device 122. For example, a user may keep an address book in a client application hosted by the user's personal computer (e.g., Microsoft Outlook) or keep an address book in a native address book application supported by the user's mobile phone. For example, a user may keep an address book hosted over the Internet by a remote server (i.e., the address book is hosted "in the cloud") and access the address book via a web browser on a client device 122.

Figure 1:
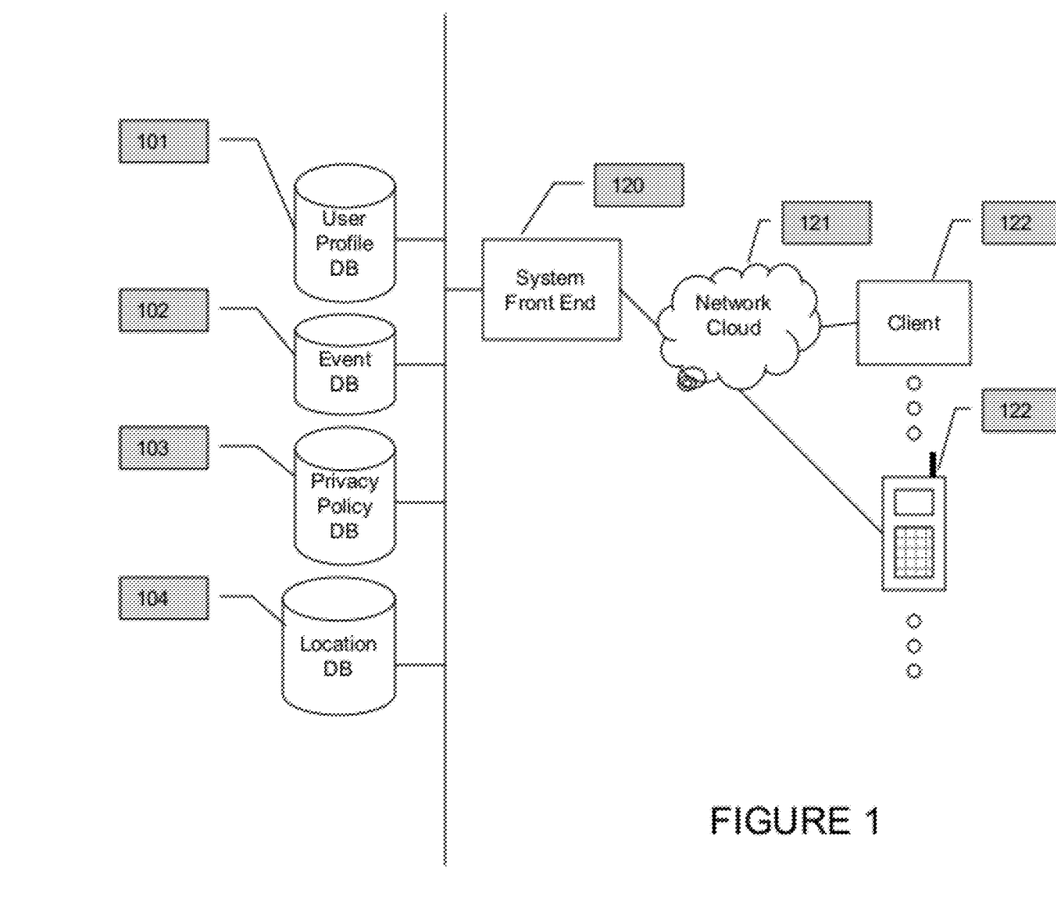
FIG. 1 illustrates an example social networking system.

FIG. 1 illustrates an example social networking system. In particular embodiments, the social networking system may store user profile data and social graph information in user profile database 101. In particular embodiments, the social networking system may store user event data and calendar data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store geo-location data identifying a real-world geographic location of an object, such as a mobile device, associated with a check-in. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning.

In particular embodiments, location database 104 may store an information base of places, where each place includes a name, a geographic location and meta information. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid (i.e., geometric center) of the shape. For example, meta information of a place can include information identifying be the user that initially created the place, reviews, ratings, comments, check-in activity data, and the like.

Places may be created by administrators of the system and/or created by users of the system. For example, a user may register a new place by accessing a client application to define a place name and provide a geographic location and cause the newly created place to be registered in location database 104. The creating user or other users may access a web page directed to the page and add additional information, such as reviews, comments and ratings for the place.

In particular embodiments, location database 104 may store a user's location data. For example, location database 104 may store a user's check-in activities. For example, a user can create a place (e.g., a new restaurant or coffee shop), causing the social networking system to stores the user created place in location database 104. For example, a user can create a comment, a review, or a rating of a place, causing the social networking system to store the user's comment, review and rating of the place in location database 104.

In particular embodiments, user profile database 101 may store communication channel information and an address book of a user. In particular embodiments, the address book may contain one or more contacts (e.g. a person or an business entity), and communication channel information for each contact (e.g., a phone number, a user ID for an IM service, an email address, a user ID for a social networking system, home address, etc.). In particular embodiments, a user may access the address book, look up and connect to a contact through a communication channel.

Ordinarily, when a person wants to connect to another person via a particular communication channel, several steps are involved. For example, if Bob wants to contact John from Bob's mobile phone, Bob would leave the application he is currently using and select an address book application on his mobile phone, find John in the address book application, select a particular communication channel, and switch to an application for the selected communication channel to initiate a connection to John. Also, an address book application such as a native address book of a mobile phone usually presents a contact's communication channels in a pre-set order, e.g., a phone number, an email address, a user ID of an IM service, etc. But the pre-set order is often not optimal. For example, John may be in a time zone currently in mid night, then it is better for Bob to send an email to John instead of calling John, even the pre-set order has John's phone number first, before John's email address. Certain embodiments herein describe methods in an avatar-based system that improve efficiency and user experience in establishing connections between users by automatically selecting a communication channel and launching an application for the selected communication channel. As described below, the avatar of a target user and the communications channel information of the user are presented within the context of a first application and user interface. Selection of a target user avatar and communications channel may launch a second application corresponding to the selected communications channel (such as a chat or email client, a phone dialer, an SMS interface, and the like).

Figure 2:
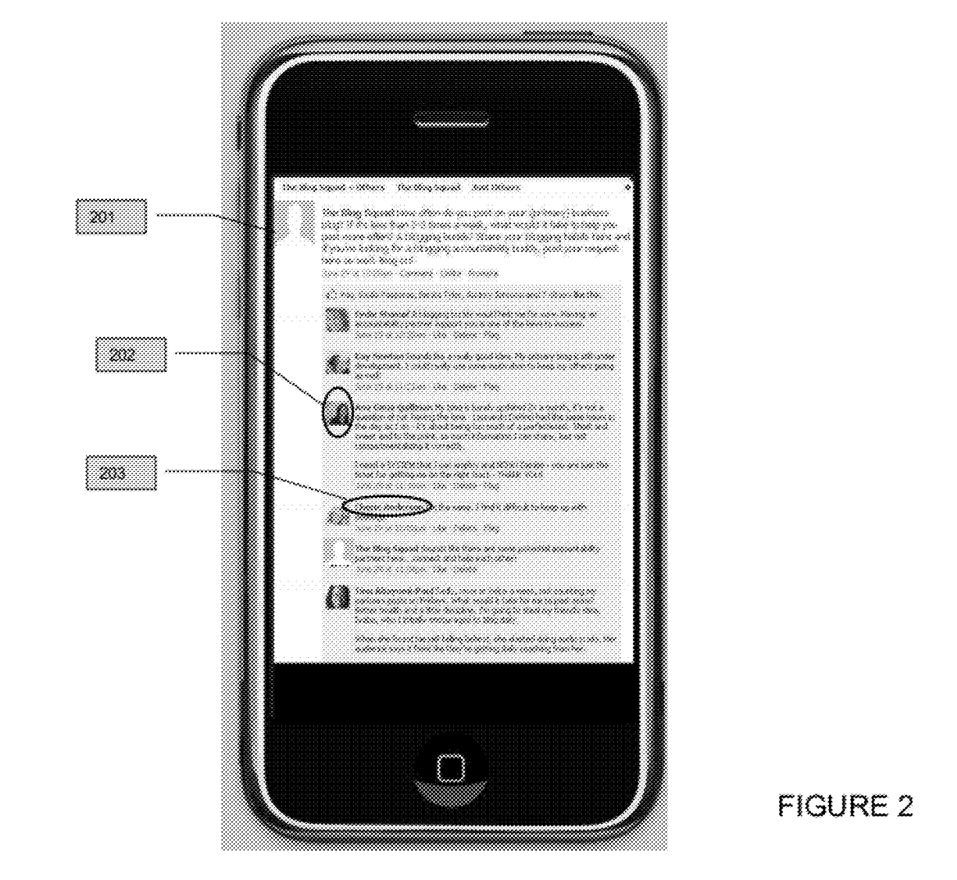
FIG. 2 illustrates an example user interface displaying a set of wall-posts in a social networking system.
Figure 2A:
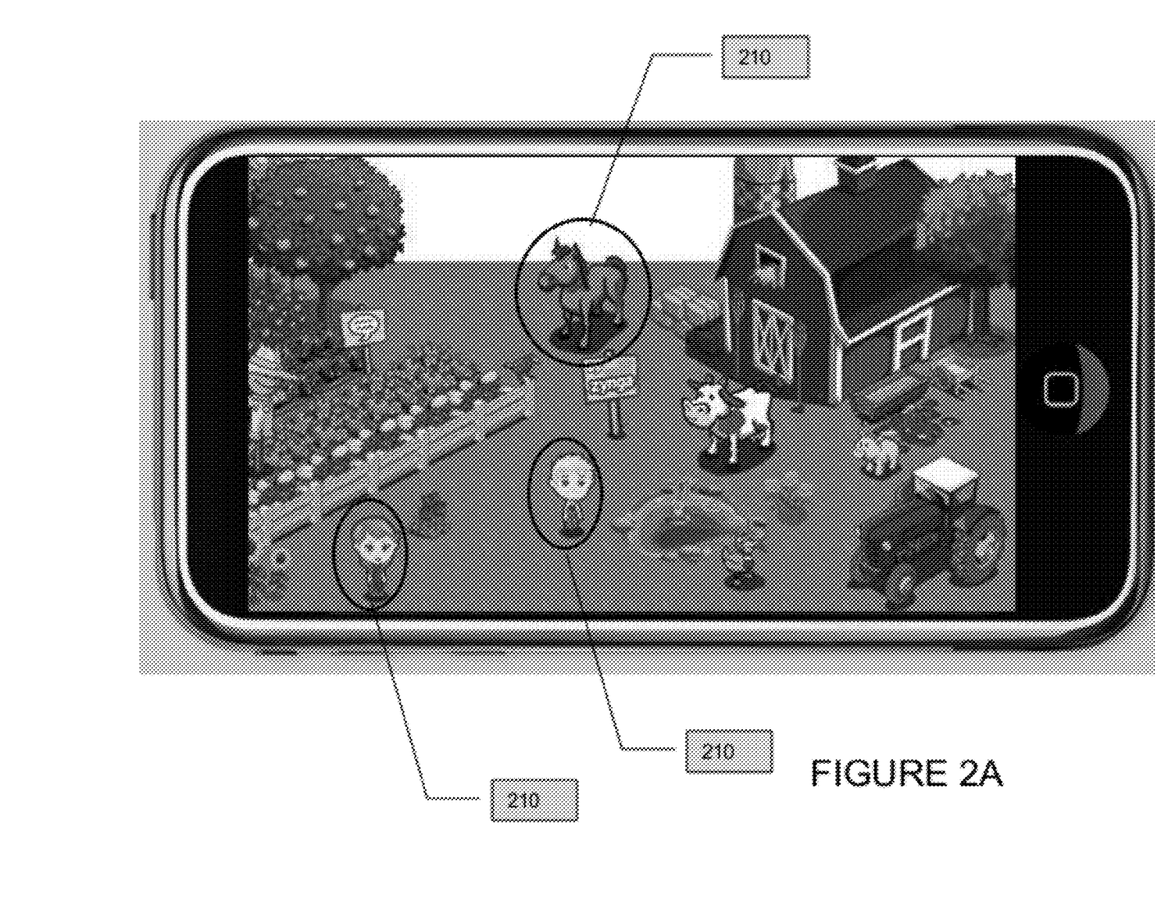
FIG. 2A illustrates an example user interface of a computer game.

An avatar is a representation of a user in a graphical user interface associated with an application. The application may be hosted on a remote server, which may transmit structured documents or other data that allows a client to construct a graphical user interface. In other implementations, the application may be hosted locally on a remote client device, such as a mobile device. The avatar may include a picture or other images associated with a user, or be an animated character in the context of a game or other application. A graphical user interface can be a user interface associated with a computer-implemented game, a productivity application (such as a calendar or word processor), a communications application (such as email or chat), a social networking application, and any other suitable application. The application may be a web-based or network application implemented in connection with a web browser, or a stand-alone application hosted on a client device (or server). For example, a graphical user interface can be a user interface of an address book natively supported by a mobile device. In particular embodiments, an avatar may be a graphic icon representing a user in a computer user interface. In particular embodiments, an avatar may be a photographic picture representing a user in a computer user interface. FIG. 2 illustrates an example of a wall-post of a social networking system. For example, user can view and add comments to a wall-post in a web-browser or a client application hosted by the user's mobile phone as shown in FIG. 2. In FIG. 2, a graphic icon (201), a photographic picture or a profile picture (202), and a text string or user/screen name (203) are examples of avatars in a user interface of a client application of a social networking system. FIG. 2A illustrates an example user interface of a computer game. In FIG. 2A, graphic icons (210) are examples of avatars in a user interface of a computer-implemented game.

The avatar is an activatable control that launches a communications session with a target user associated with the avatar. A client application can render the avatar associated with a user as an activatable control. The avatar is encoded with communications activation link that uniquely identifies an entity, such as a person, associated with the avatar and includes parameter or other information that indicates the intention to initiate a communications session with a target user associated with the avatar. The uniquely identifying information may be a user identifier that uniquely identifies the entity relative to a social networking system or other remote networked system. The activation link may be a uniform resource locator (URL) that includes domain information of the social networking system. The parameter information that indicates an intention to initiate a communications session may include predetermined codes in a parameter string following the domain information. In other implementations, the parameter information indicating such intention may be a custom URL (e.g., commlaunch://facebook.com/php?targetuser=johnsmith&&context=phone). The activation link information may be embedded or included in a structured document, such as an HTML or XML page, that is processed by a general purpose browser client or a special purpose client application. In one implementation, activation events corresponding to the avatar are associated with a handler function that can launch communications initiation function that may operate as described below. For example, a tap or click on an avatar rendered in a browser or other application window can generate a click event. A handler function, based on the parameter information, identifies the intention to launch a communication session and accesses social networking system for communications channel information of the target user. The communications handler function can be implemented in part as a set of library functions that are pre-bundled part of an operating system of the host device, such as a mobile device. In other implementations, the communications initiation function may be embodied in a companion application, which can register the custom URL with the underlying operating system of the mobile device or other host. Therefore, the avatar, when activated (such as clicked, tapped etc.), is an activatable control rendered in a first application that allows a user to initiate communications with a target user directly from the first application, such as a computer-implemented game or a web page. Prior art implementations require a user to leave the first application and enter a phone dialer or other communications application, access contact information of the user and initiate a communications session. As described below, activation of an avatar causes the communications initiation function to make calls to social networking system to resolve one or more communications channels to use to initiate contact with the target user. In some implementations, social networking system can provide the available communications channel interface to mobile device or other users that operates to provide currently available communications channels associated with a target user.

The inputs that cause a communications session to be launched can vary depending on engineering or user interface design choice. For example, an initiating user may launch a communications session by double-clicking or double-tapping an avatar. In other implementations, a right click may launch the communications session. With touch pad or multi-touch displays, a communication session may be launched by touching the avatar and holding the position down for a threshold period of time. In other implementations, the avatar may be selected and dragged to a special region or hot corner of the display to launch the communications functionality.

Figure 3:
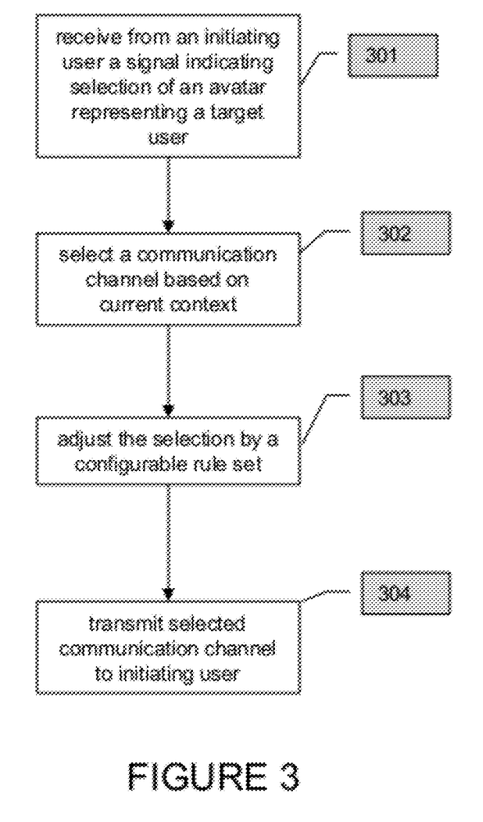
FIG. 3 illustrates an example method of establishing connections between users by an avatar-based communication launching system.

FIG. 3 illustrates an example method of establishing connections between users by an avatar-based communication launching system. FIG. 3 can be implemented by an avatar-based connection process hosted on one or more computing devices of the social networking system. In particular embodiments, the social networking system may store contact information of its users in user profile database 101. In particular embodiments, the contact information may comprise the contact's name or user ID, and information of one or more communication channels, including (but not limited to) email addresses, chat user identifiers, land line (business & home) numbers, and mobile device numbers. In some implementations, social networking system may also maintain an address of contacts for one or more users. Each contact entry may include the same or similar types of information stored for a user.

In particular embodiments, the avatar-based connection process may receive from an initiating user a signal of selection of an avatar representing a target user in a computer user interface of the initiating user's client device 122 (301). As discussed above, for example, the initiating user can select an avatar representing the target user by tapping on the avatar, or by doubling clicking the avatar with a pointer in the user interface. In particular embodiments, a client-side process (as discussed above) may access the social networking system, and look up the target user in user profile database 101. In particular embodiments, the avatar-based connection process may select a communication channel of the target user based on current context (302).

In particular embodiments, the avatar-based connection process may access user profile database 101 and determine a time zone and time of the day of the target user based on location information associated with the user. The location may be a current location (if one is available) or a registered location associated with a user profile of the target user. Current location may be determined based on check-in activity or other means, such as a client application hosted on a mobile device of the target user that polls GPS functionality of the mobile device and reports the location information on a periodic basis to the social networking system. In particular embodiments, the current context may comprise time of the day of the target user. For example, if the target user is in a time zone where the current time is past midnight, the avatar-based connection process can select an asynchronous communication channel (e.g., email, SMS, wall post to a social networking system) over a synchronous communication channel (e.g., a phone call).

In particular embodiments, the avatar-based connection process may access the target user's calendar events stored in event database 102. In particular embodiments, the current context may comprise current calendar event of the target user. For example, if the target user is in a meeting, then the avatar-based connection process can select an asynchronous communication channel over a synchronous communication channel. In particular embodiments, the avatar-based connection process may perform analysis on the target user's current calendar event and select a communication channel based on the analysis. For example, if the target user is currently in an event tagged with "urgent" or "confidential", the avatar-based connection process can select an asynchronous communication channel, and if the target user is currently in an event labeled "lunch", the avatar-based connection process may select a synchronous communication channel. In particular embodiments, the avatar-based connection process may select a communication channel based on one or more attendees of the target user's current calendar event. For example, if the initiating user is one of the attendees of the target user's current calendar event, the avatar-based connection process can select phone call or SMS text messaging as the selected communication channel.

In particular embodiments, the avatar-based connection process may access the social networking system and determine one or more current activities of the target user. In particular embodiments, the current context may comprise one or more current activities of the target user. For example, if the avatar-based connection process determines that the target user is currently accessing a music streaming service or a game application, then the avatar-based connection process can select an asynchronous communication channel over a synchronous communication channel. For example, if the avatar-based connection process determines that the target user is currently accessing a particular online game application, then the avatar-based connection process can launch the particular online game application and connect the initiating user with the target user (e.g., a chat session within the particular online game application).

In particular embodiments, the avatar-based connection process may access the social networking system and determine a current communication mode of the target user. In particular embodiments, the current context may comprise current communication mode of the target user. For example, if the avatar-based connection process determines that the target user is currently using an instant messaging application in the social networking system, the avatar-based connection process can launch the instant messaging application and connect the initiating user with the target user in the instant messaging application. For example, if the avatar-based connection process determines that the target user is currently on a call using a VoIP application in the social networking system, the avatar-based connection process can select an asynchronous communication channel (e.g., email) over a synchronous communication channel (e.g., phone call).

In particular embodiments, the avatar-based connection process may access location database 104 and determine current location information of the target user. In particular embodiments, the current context may comprise current location information of the target user. For example, if the avatar-based connection process accesses location database 104 and determines that the target user has a GPS location in close vicinity of the initiating user, the avatar-based connection process can select a synchronous communication channel (e.g., phone call) so that the two users can meet up. For example, if the avatar-based connection process accesses location database 104 and determines that the target user has recently checked in at a place where the current time is past midnight, the avatar-based connection process can select an asynchronous communication channel over a synchronous communication channel.

In particular embodiments, the avatar-based connection process may adjust the selection of a communication channel by a configurable rule set (303). The rule set, in one implementation, may be configured by the target user to adjust the operation of the communications channel selection process. In particular embodiments, a user of the social networking system may configure a rule set and stored the configured rule set in user profile database 101. In particular embodiments, the avatar-based connection process may access user profile database 101 and determine the existence of a configured rule set by the target user. In particular embodiments, if the target user has the configured rule set stored in user profile database 101, the avatar-based connection process may adjust the selection of a communication channel based on the configured rule set. For example, the avatar-based connection process may select SMS text messaging if the current calendar event of the target user is "meeting" or "lunch", but if the target user configures the rule set including a rule that the target user only accepts emails during a calendar event, then the avatar-based connection process can adjust the selection of communication channel to email from SMS text messaging.

In particular embodiments, the avatar-based connection process may return communications channel information to the requesting client-side process to allow for the client-side process to initiate a connection to the target user by the selected communication channel (303). In one implementation, the responsive message identifies a communication channel and includes contact information associated with the communications channel. For example, if an initiating user selects an avatar representing the target user on the initiating user's mobile phone, and the selected communication channels is SMS text messaging, the client-side process can access an SMS application on the initiating user's mobile phone and start an SMS session with the target user. In particular embodiments, if the client-side process cannot access the social networking system, or the social networking system does not have communication channel information of the target user, the client-side process may access an address book application accessible on the initiating user's client device 122, select a communication channel of the target user, and initiate a connection to the target user by the selected communication channel.

Figure 4:
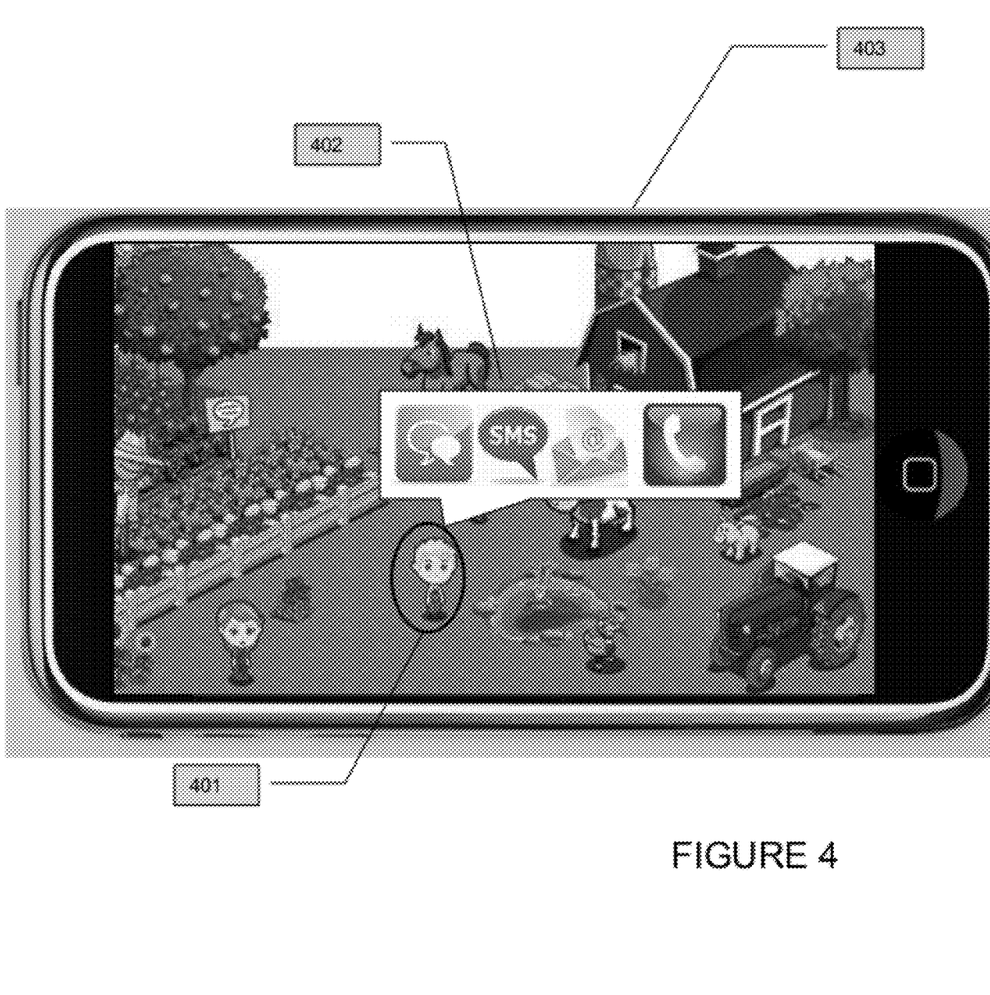
FIG. 4 illustrates an example user interface of establishing connections between users by an avatar-based communication launching system and a user selection.

Alternatively, other embodiments can provide a list of one or more communication channels to a user and the user can select one of the one or more communication channels. FIG. 4 illustrates an example user interface of establishing connections between users by an avatar-based communication launching system and a user selection. In particular embodiments, the avatar-based connection process may receive from an initiating user a selection of an avatar representing a target user in a computer user interface of the initiating user's client device 122. As in the example of FIG. 4, the initiating user can select an avatar graphic icon 401 representing the target user by tapping on the graphic icon. In particular embodiments, the avatar-based connection process may access an address book hosted by the social networking system or local to the client device. For example, the avatar-based connection process can access an address book stored in user profile database 101 in the social networking system, or an address book application hosted on the initiating user's client device 122, or a native address book supported by the initiating user's client device 122, or an address book hosted by a remote server. In particular embodiments, the avatar-based connection process may compile a list of one or more communication channels of the target user from the address book. In particular embodiments, the client-side process may present the initiating user the list of one or more communication channels. In particular embodiments, the avatar-based client-side process may present the initiating user the list of one or more communication channels wherein each of the one or more communication channels is represented by a graphic icon (402). In particular embodiments, the initiating user may select one of the one or more communication channels and the client-side process may initiate a connection between the initiating user and the target user by the selected communication channel. As in the example of FIG. 5, the initiating user can select the phone icon by tapping on the icon, and the avatar-based client-side process can initiate a phone call from the target user's mobile phone 403. In some implementations, the list of communications channels returned to the user can be filtered by current context and configurable rule sets discussed above to present only one communication channel to the user (as discussed above) or a set of options for the user. The user may then select from among the available options to initiate the communication.

Figure 5:
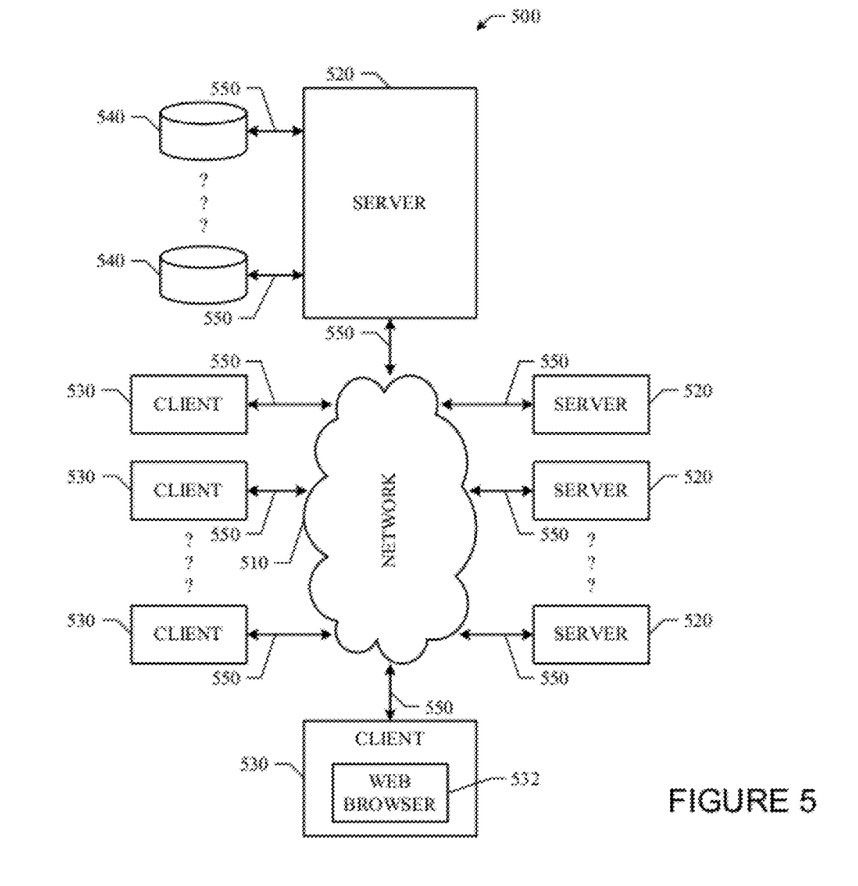
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
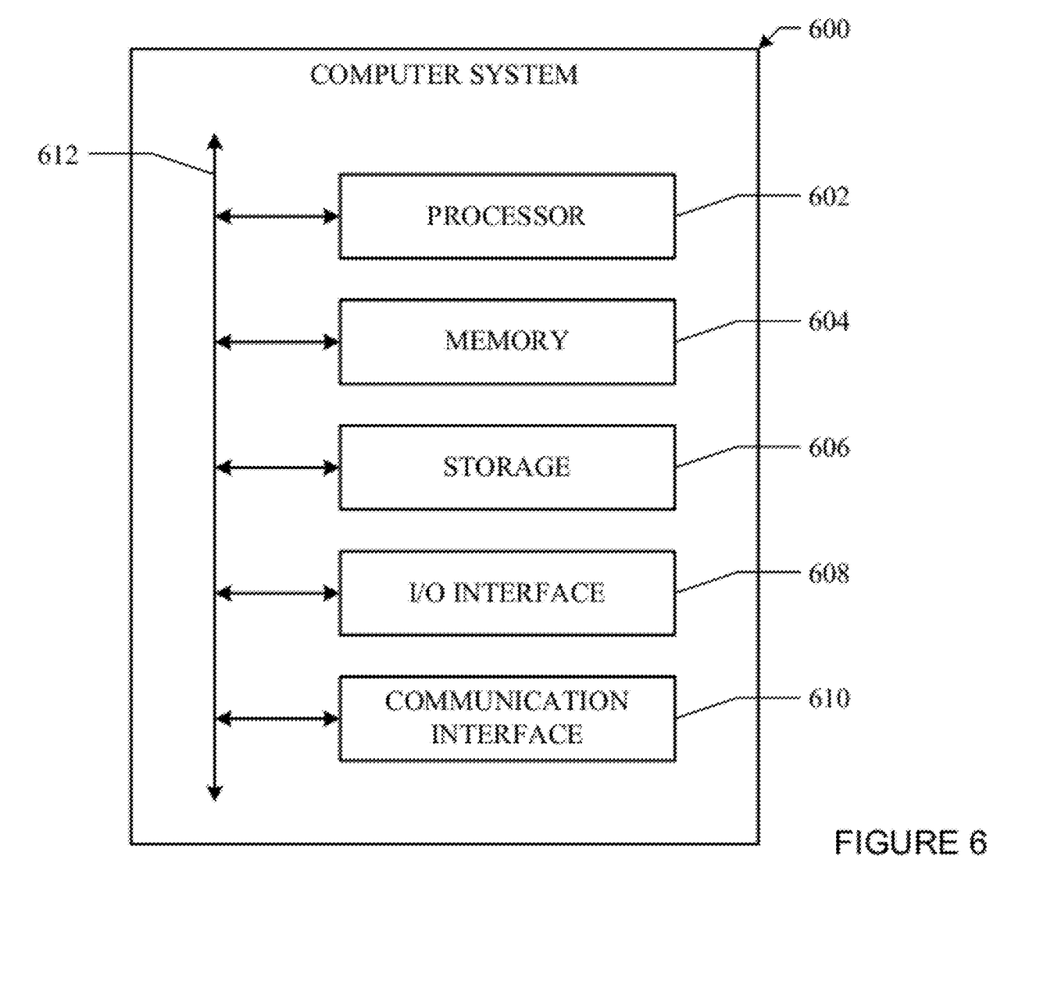
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages

606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by a first client computing device, detecting activation of an avatar by a first user, wherein the avatar represents a second user and the avatar is displayed in a graphical user interface of a first application comprising a social-networking application on the first client computing device;
by the first client computing device, in response to detecting the activation, automatically sending a request to a server computing device to select a communication channel for connecting the first user to the second user, wherein selection of the communication channel is based on contact information of the second user and current use by the second user of a second application associated with the communication channel on a second client computing device associated with the second user;
by the first client computing device, receiving from the server computing device communication-channel information for the communication channel associated with the second application that the second user is currently using on the second client computing device; and
by the first client computing device, in response to receiving the communication-channel information, automatically initiating without user input a connection between the first user and the second user by a third application on the first client computing device, wherein the third application is associated with the communication channel selected by the server for connecting the first user to the second user, and wherein the third application is synchronous to the second application.

2. The method of claim 1, wherein the avatar is a graphic icon representing the second user.

3. The method of claim 1, wherein the avatar is a photographic picture representing the second user.

4. The method of claim 1, wherein the selection of the communication channel is based on a configurable rule set of the second user.

5. The method of claim 1, wherein the selection of the communication channel is further based on a time of day of the second user.

6. The method of claim 1, wherein the selection of the communication channel is further based on a current calendar event of the second user.

7. The method of claim 1, wherein the selection of the communication channel is further based on one or more current activities of the second user.

8. The method of claim 1, wherein the selection of the communication channel is further based on a current communication mode of the second user.

9. The method of claim 1, wherein the selection of the communication channel is further based on a current location of the second user.

10. The method of claim 1, wherein:
the server is associated with a social-networking system; and
detecting activation of the avatar comprises detecting activation of an activation link that includes domain information for the social-networking system.

11. The method of claim 1, wherein detecting activation of the avatar comprises detecting activation of an activation link that is embedded in a structured document comprising an HTML or XML page.

12. A first client computing device comprising:
one or more processors; and
a memory coupled to the processors comprising instructions executable by the processors, the processors being operable when executing the instructions to:
detect activation of an avatar by a first user, wherein the avatar represents a second user and the avatar is displayed in a graphical user interface of a first application comprising a social-networking application on the first client computing device;
in response to detecting the activation, automatically send a request to a server to select a communication channel for connecting the first user to the second user, wherein selection of the communication channel is based on contact information of the second user and current use by the second user of a second application associated with the communication channel on a second client computing device associated with the second user;
receive from the server communication-channel information for the communication channel associated with the second application that the second user is currently using on the second client computing device; and
in response to receiving the communication-channel information from the server, automatically initiate without user input a connection between the first user of the social-networking application and the second user, the connection initiated by a third application comprising a communications application on the first client computing device, wherein the communications application is associated with the communication channel selected by the server for connecting the first user to the second user, and wherein the third application is synchronous to the second application.

13. The client computing device of claim 12, wherein the avatar is a graphic icon representing the second user.

14. The client computing device of claim 12, wherein the avatar is a photographic picture representing the second user.

15. The client computing device of claim 12, wherein the selection of the communication channel is further based on a configurable rule set of the second user.

16. The client computing device of claim 12, wherein the selection of the communication channel is further based on a time of day of the second user.

17. The client computing device of claim 12, wherein the selection of the communication channel is further based on a current calendar event of the second user.

18. The client computing device of claim 12, wherein the selection of the communication channel is further based on one or more current activities of the second user.

19. The client computing device of claim 12, wherein the selection of the communication channel is further based on a current communication mode of the second user.

20. The client computing device of claim 12, wherein the selection of the communication channel is further based on a current location of the second user.

* * * * *